Patented Sept. 3, 1946

2,407,087

UNITED STATES PATENT OFFICE 2,407,087

MINERAL OIL LUBRICATING COMPOSITION

Eugene Lieber, Staten Island, N. Y., and Aloysius F. Cashman, Bayonne, N. J., assignors to Standard Oil Development Company, a corporation of Delaware No Drawing. Application December 26, 1940, Serial No. 371,788

6 Claims. (Cl. 252—52)

This invention relates to a novel type of chemical condensation product and to methods of preparing such products and using them for various purposes, more particularly as pour depressors in waxy lubricating oils.

It has been known for some time that substances which reduce the A. S. T. M. pour point of waxy mineral lubricating oils can be made by various chemical condensation reactions involving organic compounds containing long aliphatic hydrocarbon chains, such as by reacting chlorinated paraffin wax with naphthalene. However, a new method has now been discovered for preparing condensation products having pour-depressing properties from a class of organic compounds containing low molecular weight aliphatic hydrocarbon groups.

Broadly, the invention comprises the production of wax modifying agents by subjecting low molecular weight aliphatic ketones to auto-condensation. Such ketones may be represented by the general formula R—CO—R', where R and R' are aliphatic hydrocarbon groups having a combined total of less than 12 carbon atoms, preferably less than 8 carbon atoms. More broadly the invention comprises the auto-condensation of ketones having the general formula X—R—CO—R'—X', where X may be hydrogen, hydroxyl, or halogen, and X and X' may be the same or different, and where R and R' are aliphatic hydrocarbon groups which may be either saturated or may contain an olefinic linkage and R and R' may be the same or different. Ketones having the formula R—CO—R', where R and R' are alkyl radicals having each less than 6 carbon atoms are preferred.

Specific examples of these ketones include acetone, methyl ethyl ketone, diethyl ketone, methyl propyl ketone, dipropyl ketone, methyl butyl ketone, dibutyl ketone, methyl amyl ketone, diamyl ketone, ethyl propyl ketone, ethyl butyl ketone, ethyl amyl ketone, methyl isobutyl ketone, methyl tertiary butyl ketone, methyl isoamyl ketone, phorone (di-iso propylidene acetone), acetonyl acetone, and others. Mixtures of two or more ketones may be used, as well as commercial products consisting essentially of one or more ketones of the class described, together with minor amounts of substances which are either inert or do not interfere with the desired auto-condensation of the ketones.

To effect the auto-condensation, it is preferred to use a condensation agent or catalyst, such as activated clay, alumina, silica gel, and various catalysts of the Friedel-Crafts type, e. g., $AlCl_3$, $FeCl_3$, $ZnCl_2$, $BF_3$, etc. The Friedel-Crafts type of catalyst is preferred. Auto-condensation in the presence of catalysts of the above types results in the substantial removal of oxygen and the formation of a high molecular weight essentially hydrocarbon product.

The amount of condensation agent to be used will, of course, vary with the particular type of condensing agent used. Generally about .01 to .10, preferably .02 to .05, mols of a Friedel-Crafts catalyst should be used per mol of ketone. With activated clays or mineral acids, larger amounts of the condensing agent should be used. It is not necessary to use a solvent or diluent in carrying out the condensation, especially with the lower molecular weight ketones; however, if it is desired to use a solvent, a refined kerosene or naphtha, which has been pretreated with strong sulfuric acid or $AlCl_3$ to make it inert, will serve as a suitable solvent. If a solvent or diluent is used, generally a slightly larger amount of catalyst is required.

The temperature for carrying out the condensation should be between the approximate limits of room temperature and about 300° F. It is preferred to add the catalyst to the ketone at low temperatures and then heat the reaction mass to the desired maximum temperature, usually between about 100° F. and 200° F. A reaction time of about ½ hour to 20 hours, preferably 1 to 5 hours, may be used. The temperature and time should be adjusted for the desired combination of yield and potency of pour depressor.

After the reaction has been completed, which may be judged by testing small samples of the product, the condensing agent is separated from the reaction mass according to known methods. For instance if a Friedel-Crafts catalyst was used, the reaction mixture is preferably cooled and diluted with an inert diluent, such as a refined kerosene and then neutralized by adding to it, or pouring it into, water, an aqueous solution of caustic soda, or an alcohol, or a mixture thereof such as a mixture of water and alcohol. The kerosene extract is then allowed to settle and the catalyst-sludge layer is drawn off. The kerosene extract is then filtered, if necessary, to remove any insoluble material and then distilled to remove the solvent and low boiling products, this distillation being preferably carried out under vacuum or with fire and steam, in the latter case carrying the temperature up to about 600° F.

The ketone auto-condensation product of this invention generally has a color and texture ranging from a green viscous oil to a brown, brittle resin. It is soluble in hydrocarbon oils. It has a fairly high molecular weight and is substantially non-volatile at temperatures below about 600° F. Although the chemical structure of these auto-condensation products is not known with certainty, it is believed that they are composed essentially of very highly branched linear chains and are composed essentially of hydrocarbons, especially when made from unsubstituted ketones.

The product of this invention has the property of modifying the crystal structure of waxes such as paraffin wax present when added to compositions containing the same. For instance, when about .05–10.0%, preferably .2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc., or for making various molded products.

For the sake of illustration, but without limiting the invention to the particular materials used, the following experimental data are given:

One liter of acetone was placed in a suitable reactor equipped with a mechanical stirrer, thermometer and reflux condenser open to the atmosphere. The reactor was cooled by an external bath of cold running water. 100 grams of anhydrous aluminum chloride was now slowly added while agitating the acetone and maintaining the temperature at 65° F. 30 minutes were required for the addition of the $AlCl_3$. After the addition of the $AlCl_3$ the reaction temperature was raised to reflux and maintained thereat for 3 hours. As the condensation of the acetone by the $AlCl_3$ progressed, the temperature of the reaction mixture gradually increased until at the end of 3 hours a reaction temperature of 140° F. was attained. The reaction mixture was then diluted with 500 cc. of kerosene and cooled below 80° F. The catalyst was then decomposed by slowly adding 1000 cc. of water to the reactor while stirring. After settling, the aqueous layer containing the aluminous sludge was drawn off and discarded. The kerosene extract containing the desired product was washed further with water and then distilled with fire and steam to 600° F. to remove solvent and low boiling products. A bottoms residue comprising 14 grams of a very viscous oil of dark green cast was obtained as product. The pour-depressing potency of this condensation product was determined by dissolving 2% of it in a waxy mineral lubricating oil base stock having a pour point of +30° F. and then testing the resultant blend for pour point according to the standard A. S. T. M. method.

A number of other condensations were carried out in the same manner, except that different amounts and types of catalyst were used to effect the condensation and various ketones and reaction conditions were used. The proportions of materials used as well as the operating conditions, yield of product and pour-depressing potency of the product are summarized in the following table.

Table

| Test No. | Raw materials | | | | Solvent | Vol. | Reaction | | Product | | |
|---|---|---|---|---|---|---|---|---|---|---|---|
| | Ketone | | Catalyst | | | | Temp., °F. | Time, hrs. | Yield | Pour point, °F. of blend (2– conc.) | |
| | Name | Amt. | Name | Gm. | | | | | | | |
| 1 | Acetone | 1000 cc | $AlCl_3$ | 100 | | | 65–140 | 3 | 14 | –30 | Dark green visc. oil. |
| 2 | do | 1000 cc | do | 200 | | | 65–175 | 3 | 40 | –15 | Brown resin. |
| 3 | do | 1000 cc | do | 400 | | | 65–170 | 2 | 65 | –15 | Brown brittle resin. |
| 4 | Phorone | 276 gm | do | 133 | Kerosene | 300 cc | 165 | 5 | 66 | +10 | Brown resin. |
| 5 | Acetonyl acetone | 228 gm | do | 133 | do | 300 cc | 175 | 1 | 88 | +10 | Black resin. |
| 6 | Methyl ethyl ketone | 750 gm | do | 100 | None | | 175 | 3 | 14 | –25 | Brown resin. |
| 7 | Acetone | 100 gm | $H_3PO_4$[1] | 35 | do | | Room | [2] 288 | 4 | –35 | Do. |
| 8 | do | 100 gm | NaOH[3] | 35 | do | | do | [2] 288 | 11 | –20 | Do. |
| 9 | Methyl ethyl ketone | 100 gm | $H_2SO_4$[4] | 35 | do | | do | [2] 288 | 23 | –20 | Do. |
| 10 | do | 100 gm | $H_3PO_4$[1] | 35 | do | | do | 288 | 5 | –35 | Do. |
| 11 | Methyl isobutyl ketone | 300 gm | $H_2SO_4$[4] | 300 | do | | do | 840 | 8 | –5 | Red resin. |

[1] 85% strength.
[2] Followed by reflux at 180–200° F. for 1 hour.
[3] Dry pellets.
[4] 96.5% strength.

This table shows that the auto-condensation products of the low molecular weight ketones, lowered, i. e., depressed, the +30° F. pour point of a waxy mineral lubricating oil by at least 20° F. and in some cases by as much as 65° F. (i. e. down to –35° F.), thus indicating that the products of this invention are potent pour depressors.

If desired, the yield of potent pour depressor obtained in these auto-condensation reactions can be increased by subjecting some of the intermediate condensation products which have been recovered overhead when subjecting the condensation products to the fire and steam distillation up to 600° F., to a further condensation with an additional quantity of aluminum chloride or other catalyst, and then subjecting the resultant condensation product to a catalyst-removal treatment and final fire and steam distillation, the same as described above.

The condensation products of the low molecular weight aliphatic ketones not only are pour depressors but also impart other valuable properties to mineral lubricating oil when added thereto, such as resistance to oxidation, decreased sludge formation and enhanced oiliness.

It is not intended that this invention be limited to any of the specific examples which were given merely for the sake of illustration nor to any theory as to the mechanism of the operation of the invention but only by the appended claims in which it is intended to claim all nov-

We claim:

1. A composition comprising as a base a hydrocarbon product containing hydrocarbon wax and a small amount of an auto-condensation product of an aliphatic ketone having less than 12 carbon atoms, said condensation product being substantially non-volatile under fire and steam distillation conditions at temperatures below 600° F.

2. A composition comprising a hydrocarbon product containing a hydrocarbon wax and associated therewith a high molecular weight auto-condensation product of a ketone having less than 12 carbon atoms and having the general formula X—R—CO—R'—X', where X and X' are either hydrogen, hydroxyl or halogen, X and X' are the same or different, R and R' are aliphatic hydrocarbon groups and R and R' are either the same or different, said auto-condensation product being substantially non-volatile under fire and steam distillation conditions at temperatures below 600° F.

3. A composition comprising a waxy mineral lubricating oil base and a small amount of a wax modifier consisting essentially of an auto-condensation product of a ketone having the general formula R—CO—R', where R and R' are the same or different alkyl groups having less than 6 carbon atoms, said wax modifier being substantially non-volatile under fire and steam distillation conditions at temperatures below 600° F.

4. A lubricating oil composition comprising a waxy mineral lubricating oil base containing dissolved therein a pour-depressing amount of an oil-soluble high molecular weight auto-condensation product of acetone substantially non-volatile at temperatures up to about 600° F.

5. A lubricating oil composition comprising a waxy mineral lubricating oil base containing dissolved therein a pour-depressing amount of an auto-condensation product of methyl ethyl ketone.

6. A composition according to claim 3 in which the auto-condensation product has been derived by subjecting the ketone to auto-condensation in the presence of .01–1.0 mols of aluminum chloride as a catalyst per mol of ketone, at a temperature between the approximate limits of room temperature and 300° F., for about ½ hour to 20 hours, hydrolyzing and removing the catalyst, and distilling the condensation product in the presence of an inert volatile hydrocarbon solvent with fire and steam to about 600° F. to obtain the desired high molecular weight product as distillation residue.

EUGENE LIEBER.
ALOYSIUS F. CASHMAN.